United States Patent [19]
Weisker et al.

[11] 3,836,031
[45] Sept. 17, 1974

[54] MATERIAL HANDLING TRUCK APPARATUS

[75] Inventors: Alexander Weisker, Milford; Raymond L. Smith, Jr., Southbury, both of Conn.

[73] Assignee: C & M Manufacturing Company, Inc., Bethesda, Md.

[22] Filed: June 1, 1972

[21] Appl. No.: 258,889

Related U.S. Application Data

[63] Continuation of Ser. No. 22,436, March 25, 1970, abandoned.

[52] U.S. Cl............................. 214/730, 214/16.4 A
[51] Int. Cl................................................ B66f 9/14
[58] Field of Search.......... 214/16.4 A, 16.4 R, 730, 214/16.18 B

[56] References Cited
UNITED STATES PATENTS

| | | | |
|---|---|---|---|
| 2,014,351 | 9/1935 | Becker | 214/16.1 CB |
| 3,447,697 | 6/1969 | Morey et al. | 214/730 |
| 3,549,025 | 12/1970 | Messner | 214/16.4 A |

FOREIGN PATENTS OR APPLICATIONS

| | | | |
|---|---|---|---|
| 699,730 | 12/1964 | Canada | 214/730 |

Primary Examiner—Robert J. Spar
Assistant Examiner—Lawrence J. Oresky
Attorney, Agent, or Firm—Littlepage, Quaintance, Murphy & Dobyns

[57] ABSTRACT

A narrow aisle stacker attachment for a material handling truck has a mast and carriage and laterally extensible carrier for picking up and depositing loads in a storage rack. Horizontally extensible supports near the vertically movable carriage balance side moments. A set switch prevents excessive upward carriage movement when a carriage-riding operator is standing. The base has rollers which guide the truck in the narrow aisle. Rollers on the mast guide and steady the mast in aisles. A trolley pick-up automatically connects to a bus bar when the truck enters an aisle for operating the normally battery driven truck from an external power source during in-aisle movement.

9 Claims, 14 Drawing Figures

INVENTOR
ALEXANDER WEISKER

INVENTOR
ALEXANDER WEISKER

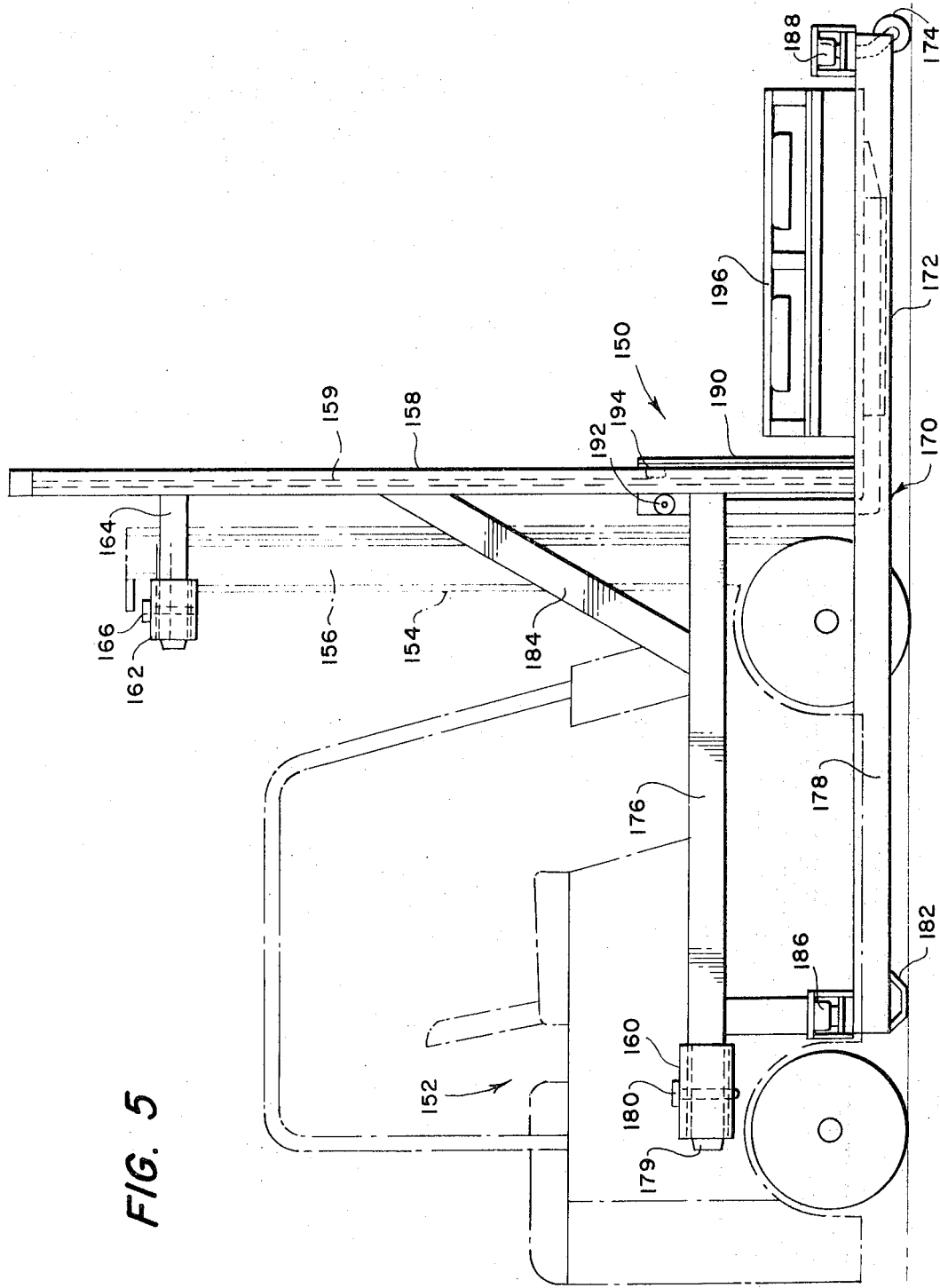

INVENTOR
ALEXANDER WEISKER

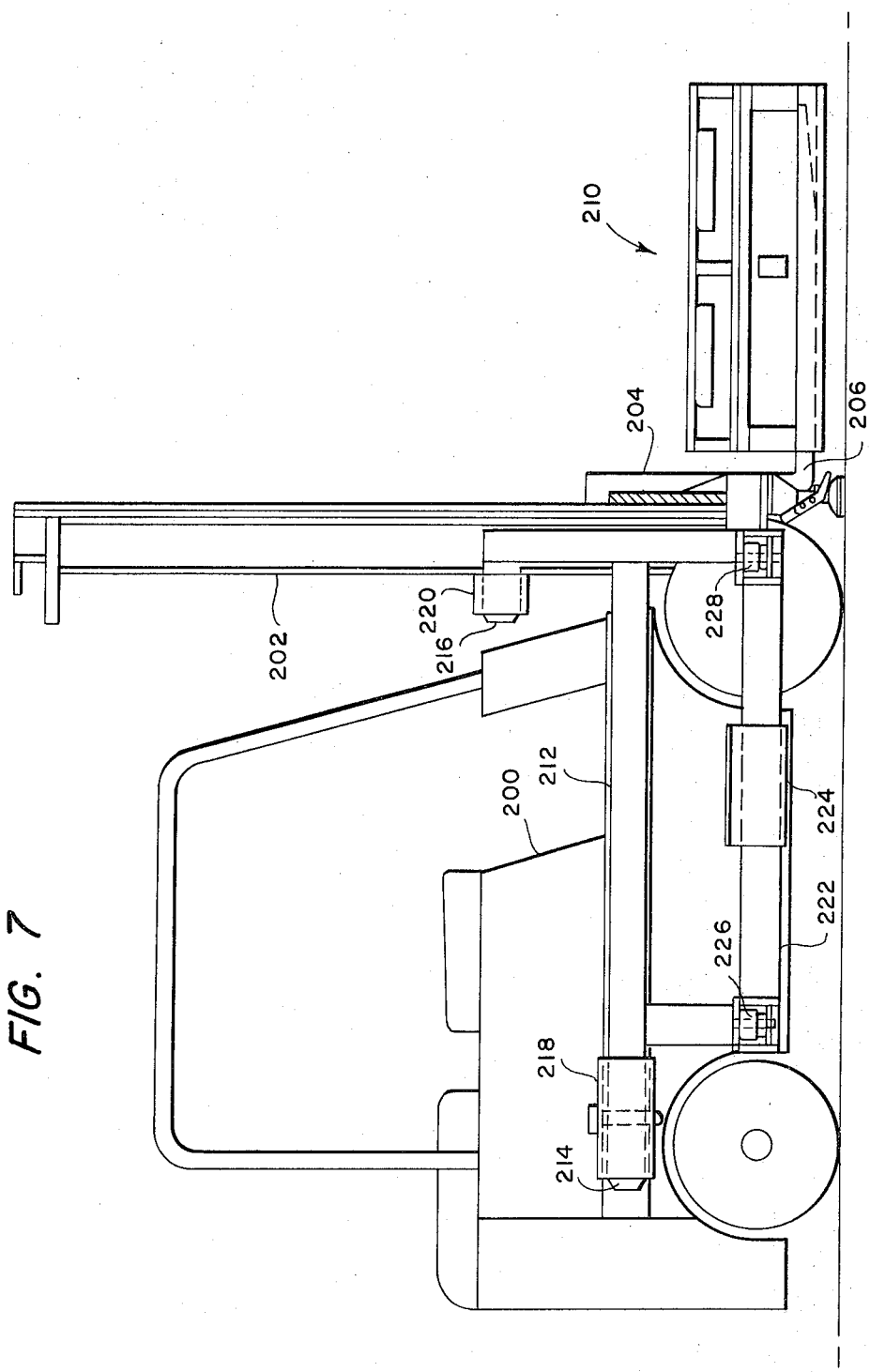

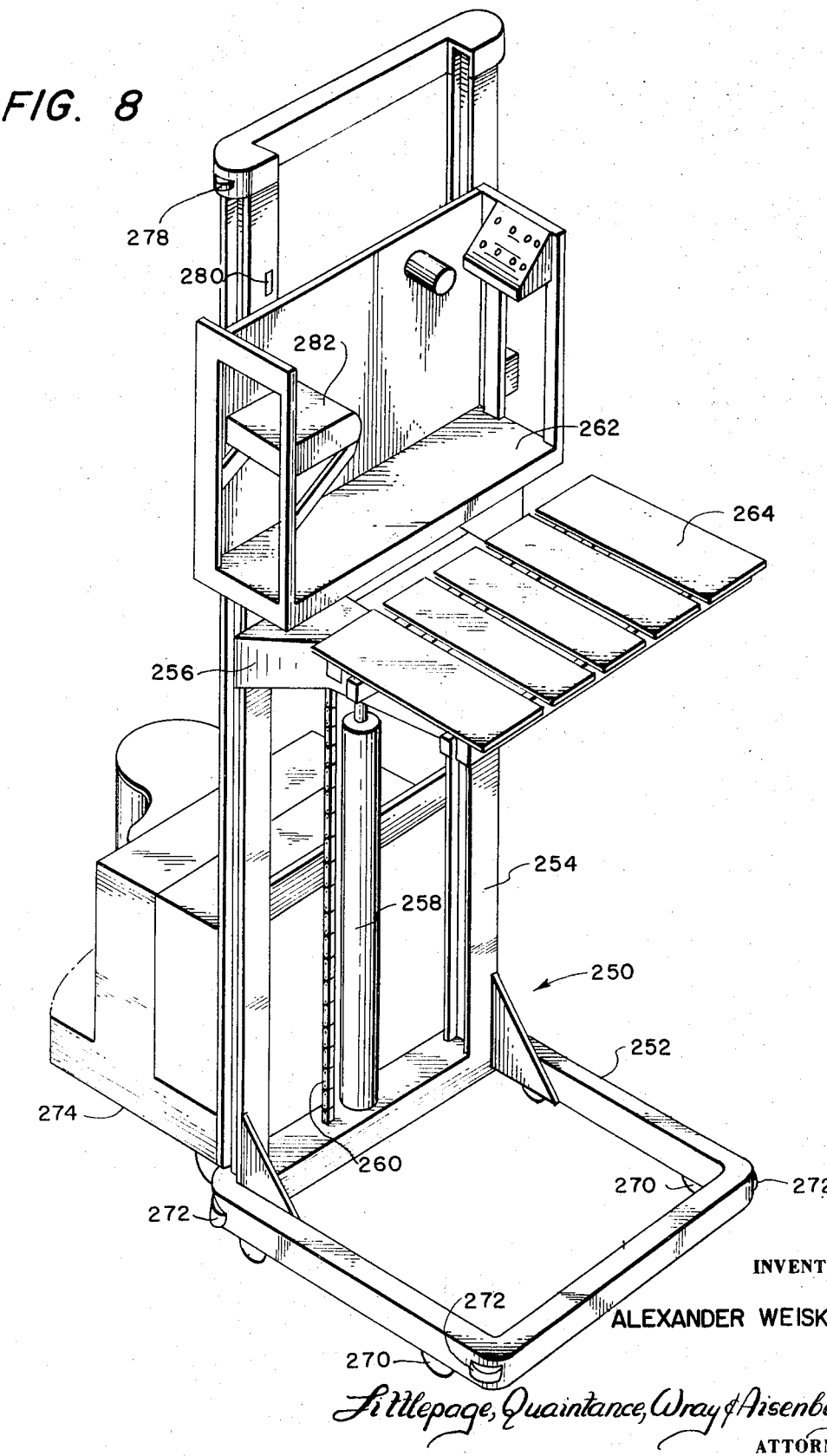

INVENTOR
ALEXANDER WEISKER

Littlepage, Quaintance, Wray & Aisenberg
ATTORNEYS

MATERIAL HANDLING TRUCK APPARATUS

This is a continuation of application Ser. No. 22,436 filed Mar. 25, 1970, now abandoned.

BACKGROUND OF THE INVENTION

Warehousing aisles must be as narrow as possible to provide maximum storage capacity within a warehouse.

Stacker cranes have been used widely in narrow aisle warehouses, because the cranes require little aisle width for operation. An aisle can be made only a few inches wider than the stacker crane or the widest load which must be transportable through the aisle. Stacker cranes have disadvantages of high initial cost in the heavy rails which must be permanently fixed within a building. Heavy traveling bridges or beams are necessary to support the cranes. The cranes require substantial clearance at the top of rack areas; consequently, roofs must be positioned several feet above the top of the highest load that is stored. In a warehouse of wide dimension, several cranes must be employed, as the cranes are incapable of straddling more than a few storage racks and aisles. Complete crane systems must be provided for every few aisles to be serviced. Mobility at the end of an aisle becomes a problem because cranes are incapable of carrying a load between remote aisles. Moreover, cranes are restriced and cannot conveniently carry loads out of a building onto a loading dock or into a vehicle.

Material handling trucks commonly known as fork lift trucks have been used in warehouses. When conventional front loading trucks with wide turning radii are used, the warehouse must have very wide aisles which are uneconomical. Some material handling trucks are designated as narrow aisle trucks because the trucks are operable in aisles which are narrower than aisles in which conventional lift trucks may operate. Even narrow aisle trucks must be turned to deposit and withdraw loads. Aisles must be sufficiently wide to permit turning of loaded trucks.

Fork lift trucks heretofore have had many disadvantages which have limited their use in warehouses.

Cantilevered or straddle trucks are very well equipped to support loads which are centered on forks along the trucks' centerlines. The trucks have insufficient lateral stability to prevent overturning of the trucks as the loads are cantilevered laterally beyond sides of the trucks. Consequently, the loads must be inserted and removed from a storage rack with the trucks pointing forward into the racks. Minimum aisle width is thus controlled by the turning radius of a loaded truck. Load size and truck design become important factors in determining minimum aisle width in warehouses.

In most warehouses, trucks which burn fuel and produce pollutants are unsatisfactory. Battery powered electrically driven trucks have a disadvantage of requiring periodic recharging or exchanging of batteries. Either the replacing of batteries or their recharging causes down time which is uneconomical. THe mobility of the trucks is reduced if they are supplied with electric power through power cords or through bus bars and trolley pick-ups.

The steering of trucks within narrow aisles has been difficult. Because aisle clearance has heretofore been great when lift trucks are employed, the difficulty has not been great. As aisles become narrower, the magnitude of the problem increases.

Steering is not a difficulty when stacker cranes are employed because the mast position is fixed on the beam as the crane is moved through the aisle. Assuming alignment of aisles and crane rails, there is no requirement for steering a mast through an aisle. Trucks, however, have no similar escape from aisle steering difficulties.

A method has been proposed for burying rails beneath floors, but such rails have prevented the free movement of trucks outside of rack areas. Stackers which run on floor mounted rails have no versatility.

Known lift truck masts are I-beams which have the supporting webs oriented parallel to the forward direction of the trucks. Little sideways bending stability is provided when elevated loads are cantilevered on the side and offset from the truck base. Consequently, lateral stresses caused by laterally cantilevered heavy loads cause load away and strain beyond elastic limits of the I-beams. Because of the fore and aft cantilevering stresses the lift forks, primary attention heretofore has been given to withstanding forward cantilevered stresses. No devices have been provided for supporting laterally cantilevered loads.

SUMMARY OF THE INVENTION

The present invention provides narrow aisle attachments for lift trucks. The attachments of the present invention make a lift truck operable within an aisle which is limited in narrowness only the width of the loads which are to be transported through the aisles. Turning of the lift truck or load is unnecessary within the aisle.

The carrier is positioned on a carriage for lateral movement in and out of a storage rack adjacent the carriage. The carriage is mounted on a mast for vertical movement therealong, and the mast is connected to a base which may be a material handling truck power unit or which may be attachments to connect the base to the mast of a materials handling truck.

Significant features of the invention are the attachment apparatus for a material handling truck, the lateral moving carrier, which converts a material handling truck to a narrow aisle stacker, the lateral support near the carrier which prevents overturning of the material handling truck when a load is cantilevered to the side of the truck, the guidance wheels which steer a truck in a narrow aisle, and the movement interlocks which prevent onboard movement of the carrier until the support is braced against a rack and which prevent upward movement of the carriage when an operator is standing. Mast means or base as used in the specification and claims describes any portion of the apparatus which is used to support the stacker carrier. The term mast means is inclusive of the carriage which may move up and down the mast.

In preferred embodiments of the invention, lateral supports are mounted very close to the carriers and usually are mounted on the carriages. The lateral supports are extensible.

The carrier may be driven with respect to the carriage by an electric motor which drives a pinion and rack on the carrier or by pistons and cylinders which may be supplied with pressurized fluid from a local pump and reservoir on the carriage or from a main pump and reservoir on the truck body, or from an auxiliary supply device thereon.

Power means which extend the lateral supports are interconnected to power means which extend the carriers so that the latter cannot be extended from the trucks until the supports have encountered rigid objects. Overextension of the lateral supports, such as when the supports are misaligned with rack members, prevents outward movement of the carriers from the carriages. latter cannot be extended from the carriages until the supports have encountered rigid objects. Overextension of the lateral supports, such as when the supports are misaligned with rack members, prevents outward movement of the carriers from the carriages.

Outward extremities of the lateral support devices may be slightly movable so as to actuate an electric switch when they are depressed by pushing them against a fixed object. The electric switch in turn completes a circuit to an electric drive motor or a solenoid valve for applying power to effect outward movement of the carrier from the carriage. Alternatively, the support may have slidable elements which are connected to a valve, for opening channels to apply fluid to the carrier actuator, when the outer end of the supports have been depressed by contacting a firm surface. After the carriage has been driven to the correct location opposite the storage area in the rack, operation of a single control moves the sensing and stabilizing devices against the rack, and a movement of the carrier into the rack is automatically effected.

In an alternate form of the invention, the lateral support may comprise a device which is connected to the mast and which supports the mast against tipping when the carrier is laterally extended. Such a device may take several forms. One convenient form is rollers which extend laterally from positions in upper portions of the mast. The rollers may be spring mounted to facilitate engagement with the rack. A support on the mast may take the form of a laterally extensible support similar to the support which is otherwise mounted on the carriage.

The mast-mounted supports may take the form of rollers which are mounted on top of the mast for engagement with stabilizing rails secured between the racks. Such support rollers may be mounted on vertical axles at the center of the mast for engaging inner surfaces of a downward opening "C" section channel track, which runs centrally at the top of an aisle. Rollers may be mounted on swingable support brackets to facilitate engagement of outer surfaces of a central rail.

Guide rails are further used to entrap the truck, while it is in the storage aisle, against any probability of overturning forward or rearward as might occur when a truck rapidly moving in either direction in the storage aisle with its load vertically extended has its brakes applied. Standard lift trucks without the present modification are specifically forbidden by regulations of many state codes and by most plant operating standards from traveling with elevated loads to avoid the possible hazards of that maneuver. It is also possible that a full or partial load accidentally sticking out into a narrow storage aisle or any other inadvertent obstruction within the aisle could upset a swiftly running truck.

Guide rails of the present invention remove any possiblity of a truck being so overturned. That is accomplished in this invention by one of two ways.

The bottom lip of the guide wheel brackets are extended beyond the face of the guide wheel. That lip is vertically spaced in relation to the wheel in a manner that permits the wheel to run against the rail while the lip projects under the rail, with a vertical clearance of about ½ inch. In that manner four adequate mechanical stops, two fore and two aft, are provided to limit any frontward or backward toppling of the attachment and the truck to which it is attached. Toppling prevention may also be accomplished by using a shaped guide rail. With that arrangement a section of the rail above the wheels protrudes to prevent any upward movement of the four wheels. In that case either the wheels or an upper extension of the wheel brackets act as the mechanical stops.

In one form of the invention, the carrier is configured for mounting directly on the forks of a conventional lift truck. Alternatively, a carrier and carriage may be provided for moving up and down the mast of a conventional lift truck. In another embodiment a mast, carriage and carrier may be provided for connection to the body or power unit of a lift truck apparatus. In a further embodiment, a mast, carriage and carrier may be provided for connection to the body or power unit of a lift truck apparatus. In a further embodiment, a mast, a carriage and carrier are configured for attaching to a mast and body of a conventional lift truck from which fork apparatus has been removed.

A specially configured carriage of the present invention may be attached to a conventional lift truck carriage. In one embodiment, a truck carriage is lifted to engage a mating hook on the side loading carriage. Then the two carriages are pinned, bolted or clamped.

Attachments to a truck body are preferably two parallel bars which extend rearward from a lower portion of the mast and which fit in brackets mounted on opposite sides of the body. Pins complete the connection when a multipurpose vehicle is desired. By removing the pins, the truck body is ready for configuration as a conventional fork lift truck. Alternatively, two parallel bars may be clamped to opposite sides of a truck body by mechanical or hydraulically actuated cam action. No brackets need be used in that configuration.

The connection between the mast and truck body is preferably rigid. The mast may be provided with a rectangular roller-mounted base, which provides all of the support necessary for carrying the load. In the latter case, the truck may simply provide horizontal movement and power for the attachment; the interconnection of the lift truck body and mast need not provide for rigid stability of the mast. Stability is provided in that case by the base upon which the mast is securely mounted.

When very heavy loads are displaced laterally from the truck at high elevations, it is preferred to use an embodiment of the invention in which double mast beams are oriented normally to each other. One pair of beams which may be permanently mounted on the truck or which may be part of a stacker attachment is mounted with beam webs oriented in a forward direction. The webs of the second beams are transverse to a forward direction of the truck. It is the second pair of beams which resist the bending moments of the load and which prevent the stressing of the first beams laterally beyond their elastic limit. When the stacker is provided as an attachment for mounting on a truck having a mast, this embodiment of the invention is preferred.

When the carriage and mast are provided as attachments for a body of a material handling truck, the carriage may be driven vertically by a hydraulic cylinder, piston, sprocket and chain which are part of the attachment. Alternatively, the vertical drive means may be provided on the material handling truck. In both cases, hydraulic power is derived from a pump and reservoir which are conventionally provided on the truck.

In a preferred embodiment, an operator's platform is provided on the carriage, so that by moving vertically with the load, the operator is positioned adjacent the load and the particular desired storage locations. An operator's seat is provided on the platform, and the seat is spring biased to an upward position. The seat base is provided with a switch which is interconnected with a switch between the carriage and its driving apparatus. The operator's seat must be depressed, and the seat switch must be actuated to enable the carriage to be driven to its uppermost limits. The safety of the operator is assured by preventing contact between him and bus bars, roof trusses, or rack interconnections which span the aisle above the racks. The truck may be driven forward or reverse while the platform and carriage are moved vertically. In a preferred embodiment of the invention, the carriage may not be above a predetermined mast position when the truck is being maneuvered at full speed outside of the track.

The problem of truck steering within the narrow aisles is overcome by providing guidance rollers in the base of the truck apparatus. The guidance rollers contact horizontally elongated vertical surfaces on the racks. The rollers may be spring mounted for slight variations of clearance in aisle width. Preferably, at least four rollers are provided, two on either side of the truck. Once a truck is in the aisle, the guidance wheels take over the steering function, and the operator need not steer the truck. Wheels at upper extremities of the mast serve a dual function as lateral support apparatus and as guidance wheels.

Far greater energy is employed in the vertical driving of a load than in the horizontal driving of a load. The major vertical movements of a carriage and its load are accomplished in the narrow aisles between racks. In a preferred form of the invention, each narrow aisle has a bus bar or other convenient means of current distribution such as conventionally are used to supply power to overhead monorails and bridge cranes, running overhead between the aisles. The material handling trucks are provided with pickup trolleys which automatically engage the power supplies upon the driving of the trucks into the aisles. As the power distributors are engaged, alternating current is rectified and direct current is fed to the truck batteries while the trucks are run therefrom. In a well known manner, the rectifying devices sense battery requirements and keep the batteries fully charged. Upon being driven out of the racks, the bus bars are automatically disengaged. Trucks have normal battery operation when moving from aisle to aisle and in other areas of the warehouse; truck batteries are recharged while the trucks are working in the aisles. No down time for battery charging or replacement is required.

One object of the invention is that the provision of attachments for material handling trucks.

Another object of the invention is the provision of laterally movable stacker carrier attachments for material handling trucks.

Another object of the invention is the provision of stacker carriage and vertically and horizontally movable carrier attachments for material handling truck masts.

This invention has as another object, the provision of stacker carrier, carriage and mast attachments for mounting on a material handling truck body.

This invention has as another objective the provision of lateral supports for material handling stacker truck apparatus.

Another object of this invention is the provision of safety movement interlocks for material handling trucks.

This invention has as another object the provision of guidance and safety apparatus for steering and preventing tipping of a material handling truck in a narrow warehouse aisle.

Another object of the invention is the provision of in-aisle external power supplies for truck battery charging and operating.

Further objects of the invention are apparent in the disclosure, including the specification, the claims and the drawings.

BRIEF DESCRIPTION OF THE DRAWINGS

FIG. 1A and 1B are details of toppling prevention aspects of truck wheel mountings and rack rails.

FIG. 5 is a side elevation of the other embodiment of a stacker attachment for materials handling truck.

FIG. 7 is a side elevation of another embodiment of the invention.

FIG. 8 is a representation of another form of a stacker attachment for a lift truck.

DETAILED DESCRIPTION OF THE DRAWINGS

Figure 1:
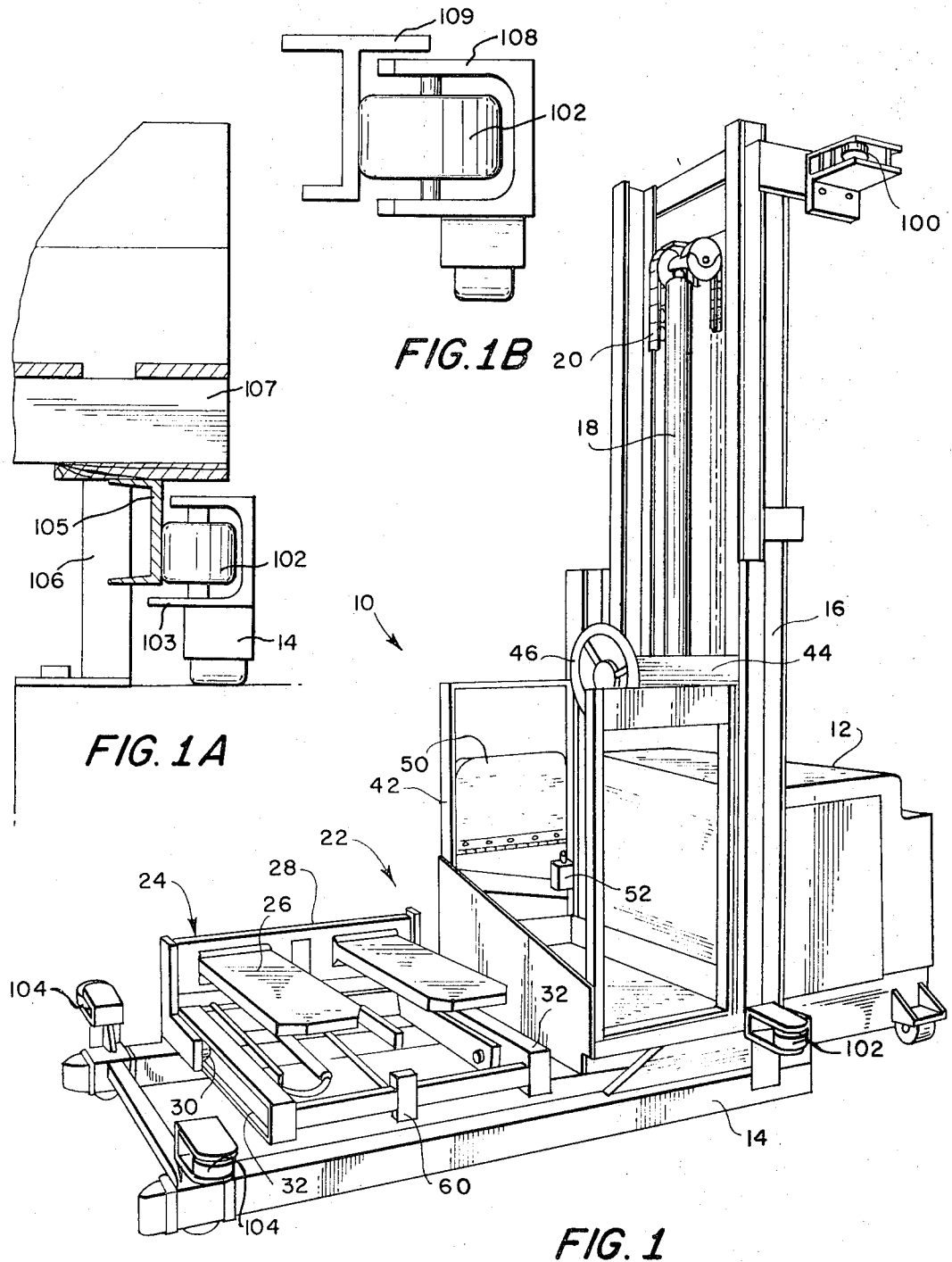
FIG. 1 represents a side loading stacker attachment for a material handling truck.

A material handling truck is generally referred to by the numeral 10. A power unit body is indicated by the numeral 12. The power unit contains a hydraulic reservoir, an electrohydraulic pump and valving. Drive wheels are included below the power unit, and an electric drive motor is connected to the drive wheels in a conventional manner. The truck depicted in FIG. 1 is a straddle type truck in which forward extending roller supported legs 14 are connected to the power unit 12. A telescoping mast 16 is mounted on the power unit.

Hydraulic cylinder 18 and its piston drive the mast vertically and chains 20, which are fixed at one end to power unit 12, and which are suspended on a piston harnessed in a conventional manner, are connected at the other end to a carriage wich is generally represented by the numeral 22. When pressure is applied to cylinder 18, a portion of the mast and the carriage move upwardly, the latter at twice the rate of the mast.

A carrier 24 is movable laterally of carriage 22 for picking up loads from the storage rack or for depositing loads therein. The movable carrier 24, as shown in FIG. 1, has forks 26 which are cantilevered from a back 28. The backing 28 is supported by rollers 30 which move in tracks 32.

Also mounted on carriage 22 is an operator's platform 42 which moves up and down the mast assembly with the carriage. Controls which operate the forward and reverse horizontal movement of the materials handling truck 10 and which operate the up and down movement of carriage 22 as well as the in and out movement of carrier 24 are located on control panel 44. When outside of a storage rack aisle, the truck is steered with wheel 46.

An operator's seat 50 is spring biased to an up position as shown in the drawings. A switch 52 is positioned beneath a seat so that a plunger of the switch will be depressed when seat 50 is placed down and sat upon by the operator. The depressing of the plunger of switch 52 completes enabling circuits which permit the full upward movement of the carriage 22 and operator's platform 42.

When forks 26 are loaded, and when the forks are driven outward from carriage 22 into the storage rack, a lateral overturning moment is generated. The overturning moment is balanced by extending a lateral support means 60 outwardly until it contacts and rests against a surface of the rack. The surface which the support 60 engages is in this case a horizontal rack member.

Figure 2:
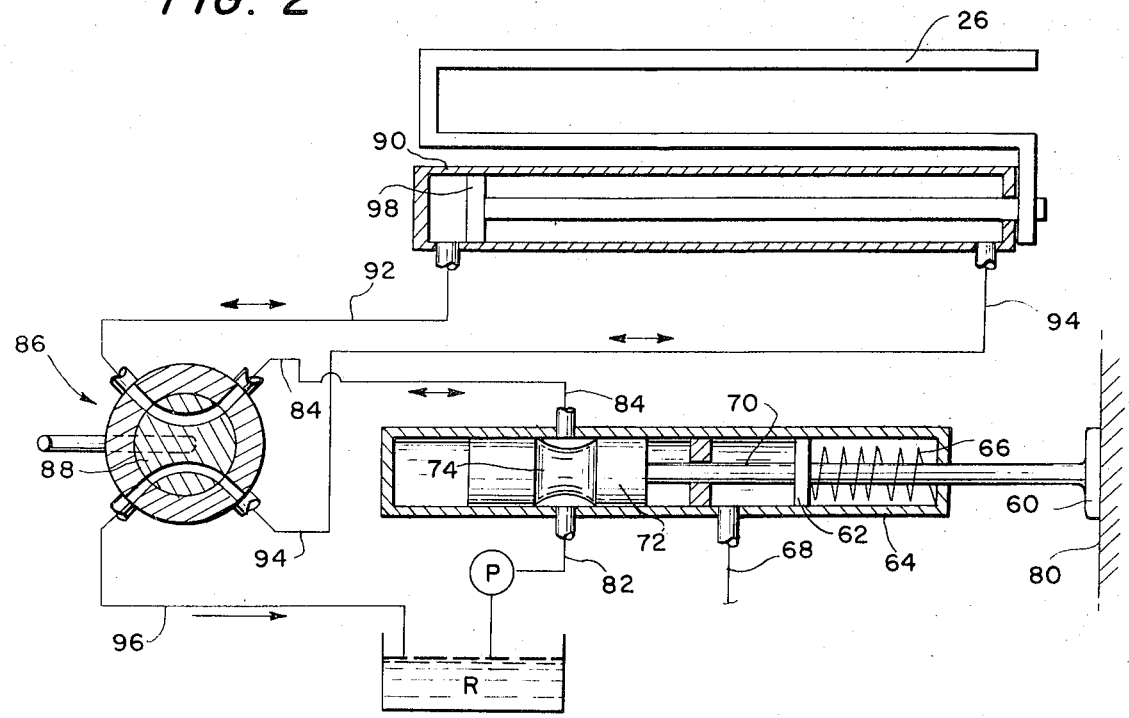
FIG. 2 is a schematic detail of a lateral support and carrier drive interlock.

As shown in FIG. 2, support 60 is driven outward by piston 62 in cylinder 64. Spring 66 holds the support member 60 and piston 62 in its inward position. Fluid is supplied to the support piston 62 by supply line 68.

A piston rod 70 is connected to a sliding valve 72, which has a central opening 74.

As long as the support 60 is pressed against a rigid object 80 within a prdetermined space before piston 62 reaches the end of its travel, opening 74 communicates the main supply line 82 with the carrier supply line 84.

Valve 86 is shown in a position wherein hydraulic fluid from line 84 is fed to the first end of the cylinder 90 through service line 92. At the same time, service line 94, which connects the other end of cylinder 90 with valve 86, is communicated with exhaust line 96. Turning valve core 88 one-quarter revolution clockwise reverses the connections. Valve 86 thus is used to select inward or outward movements of piston 98 in cylinder 90 and the related inward and outward movement of the forks 26.

In FIG. 1 roller assemblies 100, one of which is spring loaded, are mounted on opposite sides of mast 16 for guiding the mast and truck in a narrow aisle and for supporting lateral moments of the mast and its load by bearing upon a rigid rack surface. Guidance rollers 102 and 104 are connected to a bottom part of the truck apparatus. The latter rollers bear against vertical surfaces of horizontally oriented rails which are connected to the racks at prescribed distances above the floor.

As shown in FIG. 1A, the housing about roller 102 has an outward extending lower lip 103 which extends beneath rail 105 to prevent accidental fore and aft tipping of the truck when it is stopped with a raised load. Rail 105 is connected to vertical member 106 for supporting a palet 107. In FIG. 1B fore and aft tipping is prevented by rail flange 109 which extends over housing 108 of wheel 102.

Figure 3:
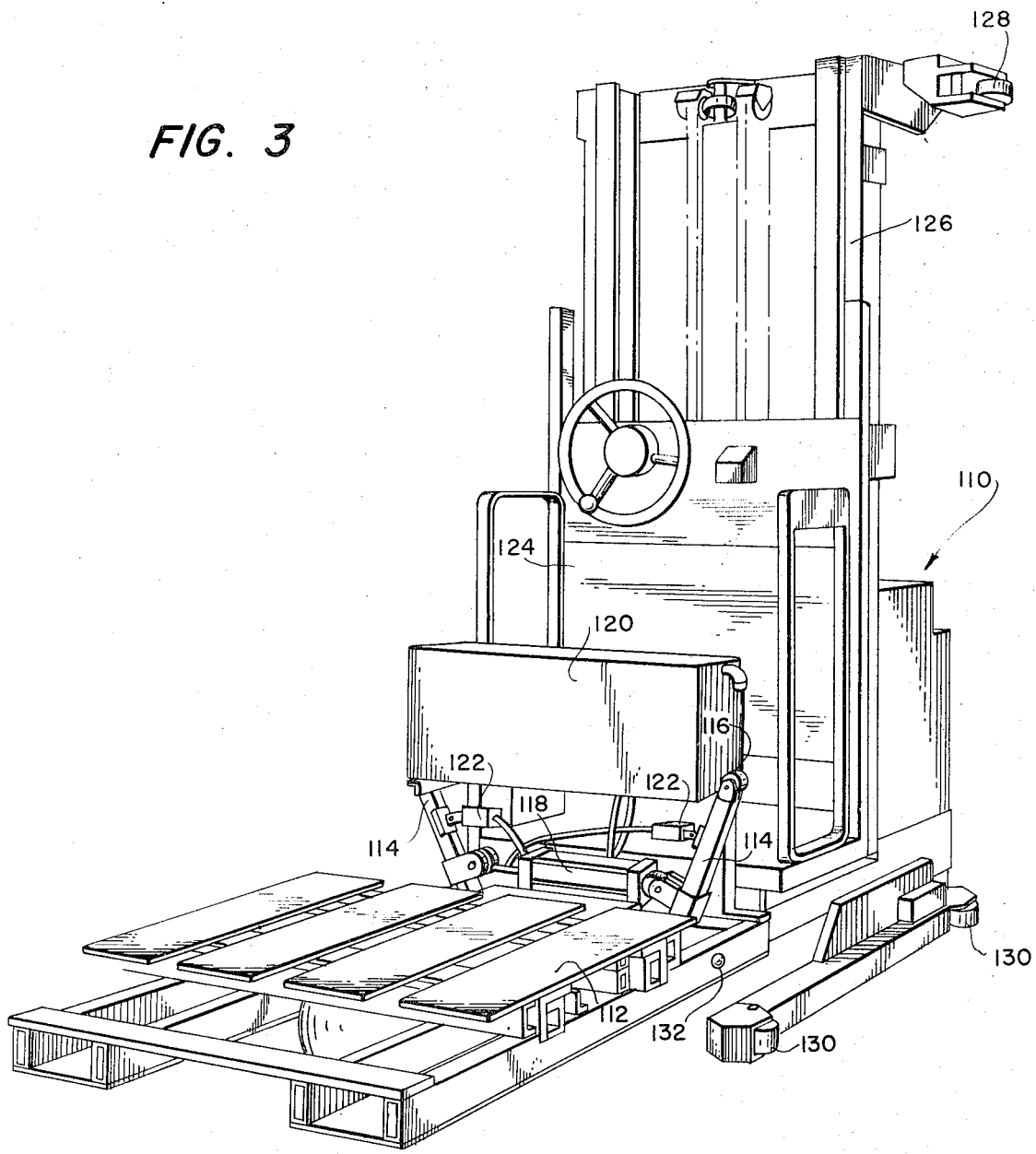
FIG. 3 is a detail of an alternate embodiment of a side loading stacker for a material handling truck.

In FIG. 3 truck 110 has a modified form of carrier 112. In this embodiment the carrier is constructed as a shuttle which may move to either side of the carriage. Before the shuttle may be moved, one of the two extensible lateral supports 114 must be pivoted downward and must be intercepted by a rigid rack member. In this embodiment, the supports are constructed with rollers 116 at ends thereof for contacting vertical rack members. Hydraulic pistons and cylinder 118 move the support members downward, and the supports are returned by spring force. Hydraulic reservoir 120 supplies fluid to a local hydraulic system which includes a pump and hydraulic actuators for the supports and shuttle. Alternatively, either the shuttle or supports or both may be operated by electric motors. Switches 122 are closed when the support arms 114 are returned to their upper position, and the closing of switch 122 completes circuits which enable movements of the truck. As in FIG. 1, the operator's platform 124 is mounted on the carriage for movement up and down on mast 126. Guidance and support rollers 128 at the upper end of the fixed mast portion are urged outward by springs. Lower guidance rollers 130 are detachable when the truck is converted to a conventional fork lift truck.

As shown in FIG. 3 the carrier apparatus is mounted on the forks of a basic fork lift truck. By removing pins 132 and by disconnecting electrical interconnections, the entire stacker carrier attachment may be withdrawn from the fork lift truck.

Figure 4:
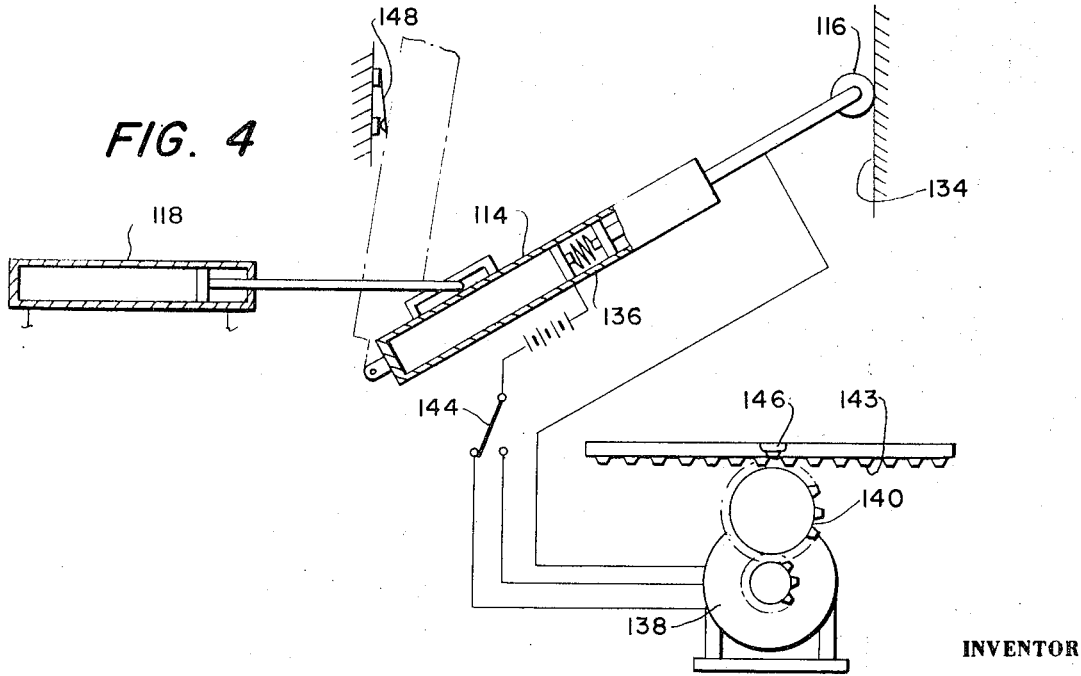
FIG. 4 is a schematic detail of a support and carrier drive interlock.

FIG. 4 is a schematic detail of movement interlocks which are provided in the stacker carrier attachment of FIG. 3. Support 114 is pivoted outward by a piston which moves in cylinder 118. As roller 116 contacts a fixed vertical surface 134, the roller is depressed, causing electrical contacts 136 to close, and completing a circuit to the electric motor 138 which drives pinion 140 and rack 142 of the carrier shuttle. Switch 144 selects the direction in which the shuttle will operate. Limit switch 146 is actuated by the return of the shuttle to the central position to permit withdrawl of support 114 from rack surface 134. Limit switch 148 is actuated by the return of support 114 to permit horizontal movement of the truck and to permit vertical movement of the carriage.

As shown in FIG. 5 a stacker attachment generally indicated by number 150 is mounted on a cantilevered forked truck 152. Truck 152 has a mast 154 which is employed for structural support by the stacker attachment. Webs 156 of mast 154 are oriented in a forward direction of the truck. The primary purpose of that web orientation is to support loads which are cantilevered on forks in front of the truck. The stacker attachment 150 has a mast 158 which is composed of two I-beams with webs 159 oriented transverse to the foward direction of the truck. The stacker mast 158 and the truck mast 154 are connected so that support is provided for loads which are cantilevered forward from the mast and cantilevered from the side of mast 158.

The truck 152 is provided with a lower pocket 160 on each side of the truck and an upper pocket 162 which is connected to mast 154. A rearward extending lug 164 which is welded to mast 158 fits into pocket 162 atop the fixed portion of truck mast 154. Pin 166 maintains the lug within the upper pocket. A bottom frame 170 is connected to stacker mast 158. The frame includes an outrigger portion 172 which is supported at its forward end by a swivel caster 174. The frame further comprises upper and lower side frame bars 176 and 178 which are disposed on either side of the truck body. The upper side frame bar 176 includes a rearward extension 179 which fits within pocket 160 which is welded to the truck body. Pin 180 secures the extension within the pocket. Foot 182 provides support for the stacker attachment when it is removed from the lift truck. Brace 184 is connected between side frame 176 and stacker mast 158 to provide additional support to the mast beam. In a preferred embodiment, the outrigger which includes the side frame bars and brace is bolted to the mast so that the elements may be disassembled for shipping.

Lower guide rollers 186 and 188 are connected at rear and forward ends of the frame for steering the fork truck in the narrow aisles.

Carriage 190 moves upward and downward along mast 158 on rollers 192 and 194. In a preferred embodiment, the carriage is driven along the mast by a conventional vertically oriented cylinder and piston with a chain interconnection for moving the carriage twice the distance that the piston moves. A side loader carrier attachment 196 which is mounted on carriage 190 operates in the same manner as the side loader carrier shown in FIG. 1 and in FIG. 3.

Figure 6:
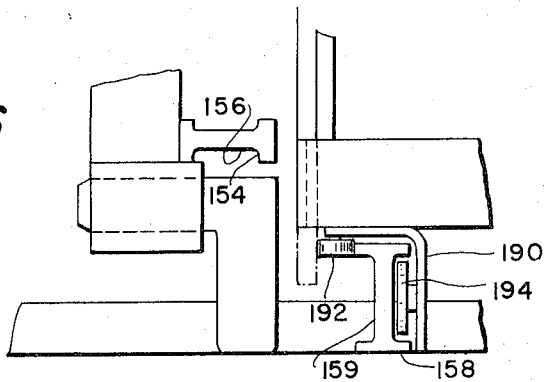
FIG. 6 is a cross-sectional detail of the apparatus shown in FIG. 5.

FIG. 6 is a horizontal sectional detail of the mast and carrier which are shown in FIG. 5. Truck mast beam 154 is shown with web 156 oriented in a forward direction of the truck while the stacker attachment mast beam 158 has web 159 oriented perpendicular to a forward position of the truck. Carriage 190 rides along stacker mast 158 on roller wheels 192 and 194.

FIG. 7 illustrates a modification of a stacker such as that shown in FIG. 5. A conventional cantilevered fork truck is generally represented by the numeral 200. Truck 200 has a telescoping truck mast 202 which supports a carriage 204 for vertical movement therealong. The carriage has cantilevered forks 206 which project forwardly from the truck. Mounted on the forks is a side loading stacking attachment 210 which is similar to the stacker shown in FIG. 1 or FIG. 3. A narrow aisle frame 212 is secured on the side of truck 200 by inserting lugs 214 and 216 into pockets 218 and 220 which are welded to the side of the truck and to the mast respectively. The lower bar 222 of frame 212 rests an open top pocket 224 which is attached to the side of fork truck 200. Side rollers 226 and 228 guide the truck and stacker attachment in a narrow aisle.

A stacker attachment is generally indicated by the numeral 250 in FIG. 8. A rectangular base 252 supports a stacker mast 254. A carriage 256 is mounted on the mast for vertical movement thereon as controlled by hydraulic cylinder 258 and chain 260. An operator's platform 262 is mounted on carriage 256 for movement along the mast. A carrier 264 is mounted on the carriage for lateral movement, and the carrier is similar to the carrier shown in FIG. 3. Lateral support devices such as shown in FIG. 3 are provided although they are not shown for simplification in this drawing.

Base 252 is provided with floor engaging rollers 270 and rack engaging rollers 272 which steer the stacker in a narrow aisle. A prime mover 274 is rigidly connected to mast 254 of the stacker for propelling the stacker attachment over the floor. Hydraulic power to drive the carriage upward and the carrier outward may be provided by a hydraulic system within the truck body 274, or a separate hydraulic system such as shown in FIG. 3 may be made part of the stacker attachment.

Upper ends of the spaced beams of mast 254 are interconnected, and the upper ends are provided with rollers 278 for supporting the mast against tipping when a load is extended on carrier 264 and for guiding the mast in the rack.

A roll-over switch 280 is positioned near an upper extremity of the mast. When the operator's platform presses against switch 280 and depresses the switch, the operator's seat 282 must be in the lowered position, depressing a switch beneath the seat as shown in FIG. 1 in order to continue upward movement of the carriage.

Figure 9:
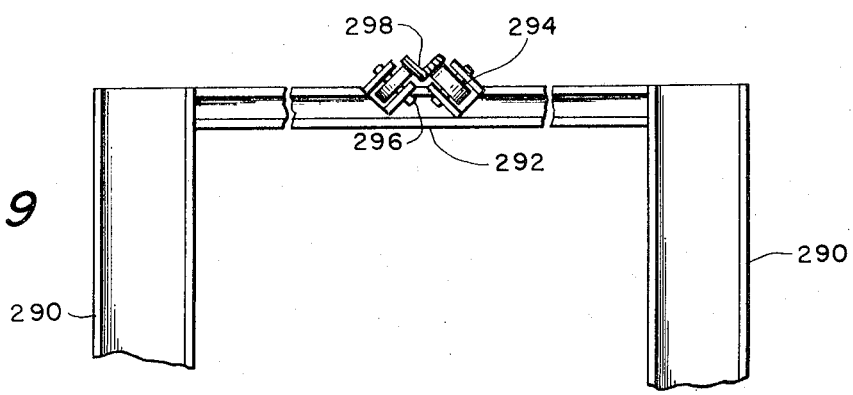
FIG. 9 is a detail of a lateral support mounted on the upper extremity of a mast.

FIG. 9 illustrates an alternate embodiment of a mast top in which mast beams 290 are interconnected by a cross beam 292. Rollers 294 are mounted on angularly related axles 296 at the center of the cross beam 292. The rollers bear upon an upper guide rail 298 which is fixed between racks on opposite sides of the stacker.

Figure 10:
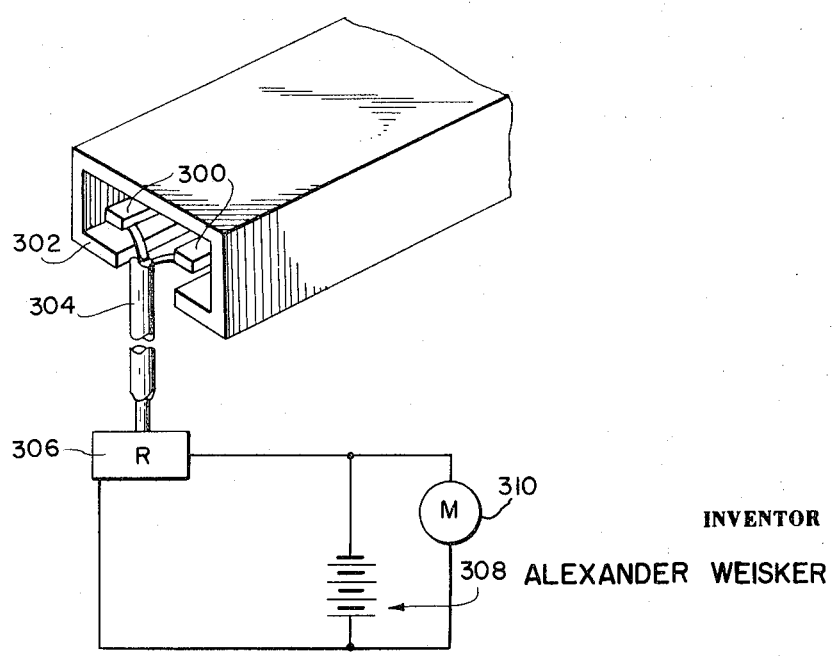
FIG. 10 is a schematic detail of a bus bar pick-up and power switching apparatus.

FIG. 10 is a schematic detail of an external power supply for truck operation when the stacker is in an aisle. Bus bars 300 are positioned in an aisle for contact by trolley 302 of a lift truck mast extension 304. Power is supplied to a rectifier device 306 from bus bars 300. Rectifier 306 charges battery 308 as the latter continues to operate truck motor 310. At the same time, rectifying device 306 senses battery requirements and replenishes the truck's battery 308. When the truck leaves the aisle, trolleys 302 disconnect from bus bars 300.

Figure 11:
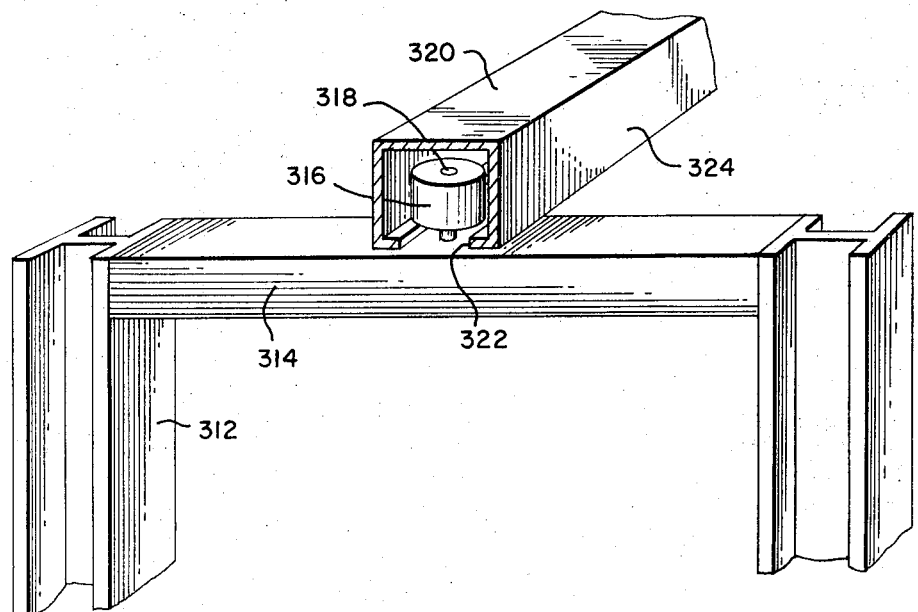
FIGS. 11 and 12 are details of preferred lateral support rollers mounted on an upper extremity of a mast.

In FIG. 11 upper extremities of mast members 312 are interconnected by a cross bar 314. Axle 318 supports a roller 316 which is received in open end 322 of rail 320. Lateral movement of the mast is prevented by roller 316 engaging one or the other internal surfaces of walls 324 in fixed channel rail 320.

Figure 12:
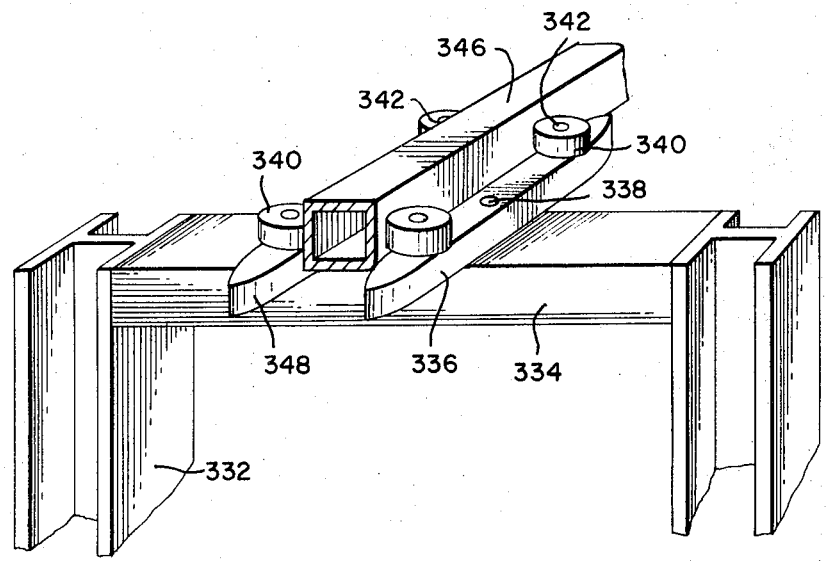

As shown in FIG. 12 bar 334 connects upper mast ends 332. Roller supports 336 are mounted for rotation on pins 338. Rollers 340 are mounted on vertical axles 342 near longitudinal ends of the supports 336, for engaging fixed track 346. Tapered ends 348 of the supports 336 aid in separating them when the mast approaches a rail.

In partial summary, the materials handling truck apparatus comprises a base, a vertical mast means connected to the base and extending upward therefrom, the mast means including a carriage movable vertically away from and toward the base, and further comprising lateral support means connected to the mast means for engaging a fixed surface and for supporting the mast means against the surface.

The truck apparatus can include a lateral support means comprising laterally extensible support means mounted on the mast means for extending therefrom and for engaging a fixed surface adjacent the mast means. The laterally extensible support means can be mounted on the carriage.

The truck apparatus can further comprise a carrier movably mounted on top of the carriage for lateral movement with respect thereto, and wherein the laterally extensible support means is mounted on the carriage below the carrier and is reciprocably extensible for engaging a rack member.

The truck apparatus can also include a carriage which further comprises a load carrier which is horizontally extensible from the carriage, and wherein the carrier is connected to a power means on the carriage for causing outward movement thereof, and further comprising a control means connected to the laterally extensible support means and connected to the power means for enabling application of power for outward movement of the carrier only upon the successful engagement of a fixed surface by the extensible support means.

Although the invention has been described using specific embodiments, several modifications of the invention will be apparent to those skilled in the art. The precise limits of the invention are defined only in the following claims.

That which is claimed is:

1. A non-tracked materials handling truck apparatus for use with a rack and capable of being positioned at any lateral spacing from the rack comprising a base, a vertical mast connected to the base and extending upward therefrom, a carriage movable vertically away from and toward the base, laterally extensible support means mounted on the carriage for engaging a fixed surface of the rack and for supporting the carriage against the surface, a load carrier horizontally extensible from the carriage for lateral reciprocal motion transverse to a forward direction of the truck, a power means positioned on the carriage and connected to the load carrier for causing outward movement thereof, and a control means, rigidly connected to the laterally extensible support means for movement therewith and connected to the power means, for enabling application of power for outward movement of the load carrier only upon the successful engagement within a predetermined lateral spacing defining the range of operable engagement of the fixed surface by the extensible support means.

2. The truck apparatus of claim 1 wherein the laterally extensible support means is mounted on the carriage below the carrier and is reciprocably extensible for engaging said fixed surface.

3. The truck apparatus of claim 2 wherein the load carrier is horizontally extensible from the support means for lateral reciprocal motion relative thereto and connected to a power means on the support means for causing outward movement thereof.

4. The truck apparatus of claim 1 wherein the outward extremity of the laterally extensible support means is slightly movable relative thereto and wherein the control means is connected to the outward extremity and senses the depression thereof when contacting said fixed surface.

5. A non-tracked materials handling truck apparatus for use with a rack and capable of being positioned at any lateral spacing from the rack comprising a base, a vertical mast connected to the base and extending upward therefrom, a carriage movable vertically away from and toward the base, laterally extensible support means mounted on the carriage for engaging a fixed surface of the rack and for supporting the carriage against the surface, a load carrier mounted above said extensible support means and horizontally extensible therefrom for lateral reciprocal motion transverse to a forward direction of the truck, a power means positioned on the support means and connected to the load carrier for causing outward movement thereof, and a control means, positioned on the laterally extensible support means for movement therewith and connected to the power means for enabling application of power for outward movement of the load carrier only upon the successful engagement of the fixed surface within a predetermined lateral spacing by the extensible support means.

6. The truck apparatus of claim 5 wherein the load carrier comprises a fork support, movably mounted on said laterally extensible support means for lateral reciprocal motion relative thereto, and a fork, cantilevered from said fork support, for picking up and depositing materials transversely to a forward direction of the truck.

7. Materials handling truck apparatus comprising a base, a vertical mast connected to the base and extending upward therefrom, a carriage movable vertically away from and toward the base, laterally extensible support means mounted on the carriage for engaging a fixed surface and for supporting the carriage against the surface, a load carrier mounted above said extensible support means and horizontally extensible therefrom for lateral reciprocal motion transverse to a forward direction of the truck, a power means mounted on the support means and connected to the load carrier for causing outward movement thereof, and a valve connected to the power means and rigidly connected to the laterally extensible support means for movement therewith, said valve, within a predetermined range of positions corresponding to the normal engagement positions between said extensible support and said fixed surface, allowing hydraulic fluid to pass through said valve to cause movement of said load carrier.

8. A non-tracked materials handling truck apparatus for use with a rack and capable of being positioned at any lateral spacing from the rack comprising a base, a vertical mast connected to the base and extending upward therefrom, a carriage movable vertically away from and toward the base, laterally extensible support means mounted on the carriage for engaging a fixed surface of the rack and for supporting the carriage against the surface, a load carrier mounted above said extensible support means and horizontally extensible therefrom for lateral reciprocal motion transverse to a forward direction of the truck, a power means mounted on the support means and connected to the load carrier for causing outward movement thereof, and a control means rigidly connected to the laterally extensible support means for movement therewith and connected to the power means for allowing power to pass through said control means to cause movement of said load carrier only upon the successful engagement within a predetermined lateral spacing defining the range of operable engagement of the fixed surface by the extensible support means.

9. A non-tracked materials handling truck apparatus for use with a rack and capable of being positioned at any lateral spacing from the rack comprising a base, a vertical mast connected to the base and extending upward therefrom, a carriage movable vertically away from and toward the base, laterally extensible support means mounted on the carriage for engaging a fixed surface of the rack and for supporting the carriage against the surface, a load carrier mounted above the carriage and horizontally extensible therefrom for lateral reciprocal motion transverse to a forward direction of the truck, a power means mounted on the carriage and connected to the load carrier for causing outward movement thereof, and a control means rigidly connected to the laterally extensible support means for movement therewith and connected to the power means for allowing power to pass through said control means to cause movement of said load carrier only upon the successful engagement within a predetermined lateral spacing defining the range of operable engagement of the fixed surface by the extensible support means.

* * * * *